United States Patent
Liu et al.

(10) Patent No.: US 11,246,181 B2
(45) Date of Patent: Feb. 8, 2022

(54) METHODS AND APPARATUSES FOR SYSTEM INFORMATION TRANSMISSION AND SYSTEM INFORMATION RECEPTION IN A WIRELESS COMMUNICATION SYSTEM

(71) Applicant: NEC CORPORATION, Tokyo (JP)

(72) Inventors: Hongmei Liu, Beijing (CN); Lei Jiang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 118 days.

(21) Appl. No.: 16/318,981

(22) PCT Filed: Jul. 20, 2016

(86) PCT No.: PCT/CN2016/090700
§ 371 (c)(1),
(2) Date: Jan. 18, 2019

(87) PCT Pub. No.: WO2018/014257
PCT Pub. Date: Jan. 25, 2018

(65) Prior Publication Data
US 2019/0239277 A1 Aug. 1, 2019

(51) Int. Cl.
*H04W 76/27* (2018.01)
*H04W 74/08* (2009.01)
(Continued)

(52) U.S. Cl.
CPC ........... *H04W 76/27* (2018.02); *H04L 5/0048* (2013.01); *H04L 5/0051* (2013.01);
(Continued)

(58) Field of Classification Search
CPC ... H04W 76/27; H04W 24/08; H04W 68/005; H04W 72/0473; H04W 74/0808;
(Continued)

(56) References Cited

U.S. PATENT DOCUMENTS

2018/0054822 A1* 2/2018 Kim ................... H04W 72/085
2019/0104549 A1* 4/2019 Deng ................... H04B 7/0617
2019/0124517 A1* 4/2019 Sugirtharaj ....... H04W 74/0808

FOREIGN PATENT DOCUMENTS

CN     101765214 A    6/2010
CN     103546906 A    1/2014
(Continued)

OTHER PUBLICATIONS

3GPP TSG-RAN WG2 Meeting #94 R2-163371, May 2016 (Year: 2016).*

(Continued)

*Primary Examiner* — Ricky Q Ngo
*Assistant Examiner* — Stephen N Steiner
(74) *Attorney, Agent, or Firm* — Sughrue Mion, PLLC

(57) ABSTRACT

Embodiments of the present disclosure relate to a method and apparatus of data transmission in a wireless communication system and a method and apparatus of receiving data in a wireless communication system. The method of data reception comprises transmitting a request for the RRC message to the network node based on default transmission parameters; and receiving the RRC message from the network node at a predetermined time unit. With embodiments of the present disclosure, it is possible to request the RRC message when the terminal device need this message and therefore the RRC message transmission can be reduced and in turn, the inter-node interference can be limited, and the number of LBTs required for these signal transmissions can be reduced if they are transmitted on unlicensed spectrum.

12 Claims, 5 Drawing Sheets

(51) Int. Cl.
  *H04L 5/00* (2006.01)
  *H04L 27/00* (2006.01)
  *H04W 24/08* (2009.01)
  *H04W 68/00* (2009.01)
  *H04W 72/04* (2009.01)
  *H04W 48/14* (2009.01)

(52) U.S. Cl.
  CPC ........ *H04L 5/0053* (2013.01); *H04L 27/0006* (2013.01); *H04W 24/08* (2013.01); *H04W 68/005* (2013.01); *H04W 72/0473* (2013.01); *H04W 74/0808* (2013.01); *H04W 48/14* (2013.01)

(58) Field of Classification Search
  CPC ... H04L 5/0048; H04L 5/0051; H04L 5/0053; H04L 27/0006
  See application file for complete search history.

(56) References Cited

FOREIGN PATENT DOCUMENTS

| | | |
|---|---|---|
| CN | 105637920 A | 6/2016 |
| JP | 2009-111624 A | 5/2009 |
| JP | 2010506434 A | 2/2010 |
| JP | 2015-165640 A | 9/2015 |
| JP | 2016-518772 A | 6/2016 |
| WO | 2015/023909 A2 | 2/2015 |
| WO | 2015/166840 A1 | 11/2015 |

OTHER PUBLICATIONS

3GPP TSG-RAN WG2 Meeting #94 R2-164088, May 2016 (Year: 2016).*
Communication dated May 12, 2020, from the Japanese Patent Office in Application No. 2019-502780.
InterDigital Communications, "System Information Acquisition for New Radio Access", 3GPP TSG-RAN WG2 #94. R2-164088, May 23-27, 2016, Nanjing, China, pp. 1-5 (5 pages total).
Communication dated Feb. 16, 2021, from the Japanese Patent Office in application No. 2019-502780.
"System information on demand in standalone NR", NEC, 3GPP TSG RAN WG2 Meeting #94, R2-163980, May 23-27, 2016, pp. 1-3 ( 3 pages total).
"LTE BCH-on-demand", NEC, TSG-RAN Working Group2#55, R2-062930, Oct. 9-13, 2006, ( 7 pages total).
International Search Report of PCT/CN2016/090700 dated Apr. 17, 2017 [PCT/ISA/210].
Written Opinion of PCT/CN2016/090700 dated Apr. 17, 2017 [PCT/ISA/237].
Communication dated Aug. 26, 2021 in Japanese Application No. 2019-502780.
Communication dated Aug. 27, 2021 in Chinese Application No. 2016800877913.
Search Report dated Aug. 20, 2021 in Chinese Application No. 2016800877913.
LG Electronics, "Observations about on-demand SI delivery mechanism", 3GPP TSG-RAN WG2 #94, R2-164078, Nanjing, China, May 23-27, 2016.

* cited by examiner

METHODS AND APPARATUSES FOR SYSTEM INFORMATION TRANSMISSION AND SYSTEM INFORMATION RECEPTION IN A WIRELESS COMMUNICATION SYSTEM

FIELD OF THE INVENTION

The non-limiting and exemplary embodiments of the present disclosure generally relate to the field of wireless communication techniques, and more particularly relate to a method and apparatus for transmitting information and a method and apparatus for receiving information.

BACKGROUND OF THE INVENTION

With the constant increase of wireless data services, licensed carrier resource is limited and hard to cope with the constantly increasing data traffic. Thus, it is proposed to use unlicensed carrier resource for data transmission, which could provide a large amount of frequency resources in a cost effective way.

Recently, the 3rd Generation Partnership Project (3GPP) organization had started standardization on Licensed-Assisted Access, which introduces the data offloading from the licensed carrier resource to the unlicensed carrier resource on small cells to deliver a data speed boost to terminal devices. For data transmission on the unlicensed carrier, it shall perform a Listen Before Talk (LBT) operation to detect whether the channel is idle. The transmission on the unlicensed carrier can only be performed when the LBT result shows that the channel is idle; otherwise the transmission will not be performed on the unlicensed carrier. Therefore, the transmission opportunity in unlicensed spectrum is limited due to the LBT.

Usually, reference signals (such as a discovery signal (DRS)) and radio resource control (RRC) message (such as system information, paging message, etc.) are both required to be transmitted to terminal devices like user equipment (UE). These signals often have different transmission periodicities and different time offsets and might have some dependency therebetween. For example, the DRS, Mater Information Blocks (MIB), System Information Blocks (SIB), and paging messages in legacy LTE systems have different periodicities and different time offsets, and the DRS/MIB/SIB/paging have dependency among each other. This means that successful decoding of one signal might depend on decoding of another signal and thus UE cannot get full system information if some of the information cannot be received successfully. In such a case, it will impact the user experience substantially. Besides, there might be also an energy consumption issue and inter-node interference issue as well.

In US application publication No. US20160165638A1, there is disclosed a solution for enhanced system access for E-UTRAN, in which a two-stage system information transmission solution and a reduced paging cycle are proposed. Particularly, in this application, in a first stage, first system information common to each cell of a group of cells in an area is broadcasted first; then second system information that can vary between cells in the group is broadcasted; and the second system information is broadcasted more frequently than the first system information.

In technical document RP-160870, New WI: Work Item on Standalone LTE operation and dual connectivity operation in unlicensed spectrum, Ericsson, 3GPP RANP#72 meeting, it discloses a standard LAA to support scheduling DRS, MIB and SIBs in a common subframe.

However, multiple LBT attempts will be still necessary for reference signal and the RRC message transmission on unlicensed spectrum if they are transmitted in different time instances and there might still be inter-node interferences due to these information transmissions.

SUMMARY OF THE INVENTION

In the present disclosure, there is provided a new solution for information transmission and information reception in a wireless communication system, to mitigate or at least alleviate at least part of the issues in the prior art.

According to a first aspect of the present disclosure, there is provided a method of receiving information in a wireless communication system, wherein the information at least comprises a radio resource control (RRC) message. The method comprises transmitting a request for the RRC message to the network node based on default transmission parameters; and receiving the RRC message from the network node at a predetermined time unit.

According to a second aspect of the present disclosure, there is provided a method of transmitting information, wherein the information at least comprises a radio resource control (RRC) message. The method comprises receiving a request for the RRC message transmitted from a terminal device based on default transmission parameters; and transmitting the RRC message to the terminal device at a predetermined time unit in response to the request for the RRC message.

According to a third aspect of the present disclosure, there is provided an apparatus for receiving information in a wireless communication system, wherein the information at least comprises a radio resource control (RRC) message. The apparatus comprises an RRC request transmission module and an RRC message receiving module. The RRC request transmission module is configured to transmit a request for the RRC message to the network node based on default transmission parameters. The RRC message receiving module is configured to receive the RRC message from the network node at a predetermined time unit.

According to a fourth aspect of the present disclosure, there is provided an apparatus of transmitting information, wherein the information at least comprises a radio resource control (RRC) message. The apparatus comprises: an RRC request receiving module and an RRC message transmission module. The RRC request receiving module configured to receive a request for the RRC message transmitted from a terminal device based on default transmission parameters. The RRC message transmission module is configured to transmit the RRC message to the terminal device at a predetermined time unit in response to the request for the RRC message.

According to a fifth aspect of the present disclosure, there is provided a computer-readable storage media with computer program code embodied thereon, the computer program code configured to, when executed, cause an apparatus to perform actions in the method according to any embodiment in the first aspect.

According to a sixth aspect of the present disclosure, there is provided a computer-readable storage media with computer program code embodied thereon, the computer program code configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

With embodiments of the present disclosure, it provides a new solution for information transmission and reception, in which the RRC message is transmitted in response a RRC message request from a terminal device when the terminal device needs this message. In such a way, the RRC message transmission can be reduced and in turn, the inter-node interference can be limited, and the number of LBTs required for these signal transmissions can be reduced if they are transmitted on unlicensed spectrum.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Figure 1:
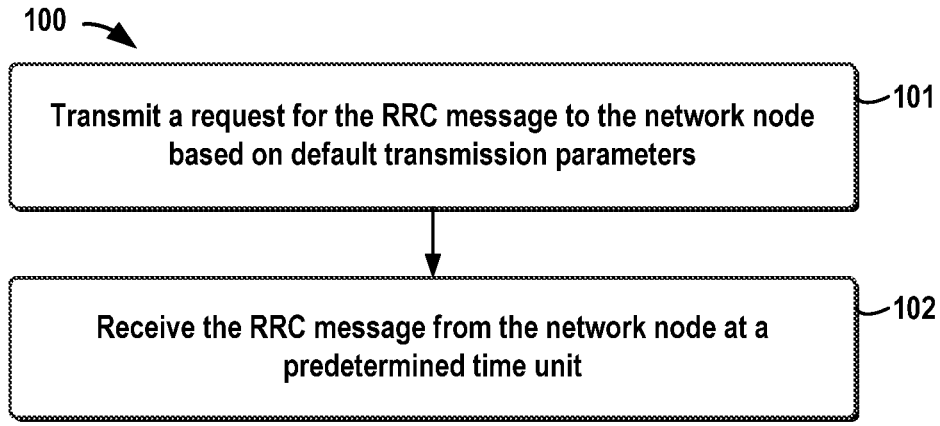
FIG. 1 schematically illustrates a flow chart of a method of receiving information in a wireless communication system according to an embodiment of the present disclosure.

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included. Furthermore, in the context of the present disclosure, the term "BS" may represent, e.g., a node B (NodeB or NB), an evolved NodeB (eNodeB or eNB), a radio header (RH), a remote radio head (RRH), a relay, or a low power node such as a femto, a pico, and so on.

As mentioned hereinabove, in the existing solutions, a reference signal and RRC message transmissions still require multiple LBT attempts and also cause inter-node interferences. Thus, in the present disclosure, there is provided a new solution of information transmission and reception to address these issues. In the present disclosure, it is proposed that a terminal device such as UE requests the RRC messages based on default transmission parameters when the terminal device requires the RRC message and the serving node such as NB or eNB can transmit the RRC message to the requested terminal device when it receives the request from the terminal device. Thus, the RRC message is transmitted only when it is required and therefore the RRC message transmission can be reduced and in turn, the inter-node interference can be limited, and the number of LBTs required for these signal transmissions can be reduced if they are transmitted on unlicensed spectrum. Hereinafter, the solution of information transmission and reception will be described in detailed with reference to the accompany drawings as provided therein.

Reference is first made to FIG. 1, which schematically illustrates a flow chart of a method 100 of data receiving in a wireless communication system according to an embodiment of the present disclosure. The method 100 can be performed at a terminal device, for example UE, or other like terminal devices As illustrated in FIG. 1, first in step S101, a request for the RRC message is transmitted to the network node based on default transmission parameters. In embodiments of the present disclosure, the RRC message may include any of RRC information elements, security control information elements, mobility control information elements, measurement information elements, other information elements, Multimedia Broadcast Multicast Service (MBMS) information elements, Single Cell-Point To Multipoint (SC-PTM) information elements, sidelink information elements, system information blocks (SIB), master information blocks (MIB), paging message and other RRC messages newly defined in the future.

Hereinafter, only for illustration purposes, the MIB, and the SIB will be described as the example of the RRC message; however, the skilled in the art shall be noticed that the present disclosure is not limited to these specific examples and it can be applied to any other kind of RRC message like paging messages as well.

The request for the RRC message can be transmitted in uplink control channel, for example, in Physical Random Access Channel (PRACH), Physical Uplink Control Channel (PUCCH), Physical Uplink Shared Channel (PUSCH), etc. In addition, the request for the RRC message may also be transmitted in uplink reference signals.

In embodiment of the present disclosure, the UE requests an RRC message if the UE requires the RRC message and it does not receive the RRC message, thus at this time it does not learn RRC message transmission parameters. Therefore, in the present disclosure, it is proposed to transmit the request for the RRC message using default transmission parameters. Next, for illustration purposes, reference will be made to FIG. 2 to describe a method of determining the default transmission parameters for the RRC message.

Figure 2:
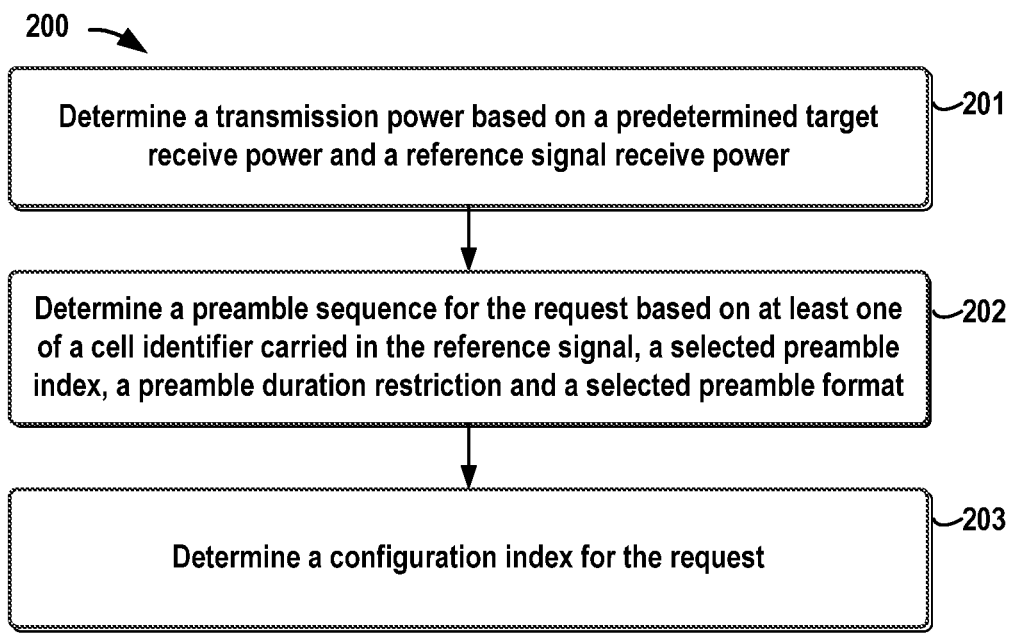
FIG. 2 schematically illustrates a flow chart of a method for determining default transmission parameters for the request according to an example embodiment of the present disclosure.

FIG. 2 schematically illustrates a flow chart of a method for determining default transmission parameters for the request according to an example embodiment of the present disclosure. The method 200 can be performed at a terminal device, for example UE, or other like terminal devices. As illustrated in FIG. 2, in step 201, the transmission power is determined. The determination of the transmission power may be based on for example, a predetermined target receive power and a reference signal receive power. The reference signal receive power is a reference value and the predetermined or default target receive power can be obtained as well. Thus, by using the two parameters, it is possible to determine the transmission power for the RRC message.

Then in step 202, a preamble sequence for the request is determined based on at least one of a cell identifier carried in the reference signal, a selected preamble index, a preamble duration restriction and a selected preamble format. For example, it may first obtain a default preamble set which are used for the RRC message, and the UE determines a cell specific preamble set from the default preamble set based on a cell id carried in discovery reference signal (DRS). The UE then can choose a preamble index randomly or based on a predetermined rule. It may set a preamble duration restriction. For example, the preamble duration may be restricted to be 1 ms or any other suitable value. Next, a suitable preamble format can be selected. Thus, it may decide a preamble sequence for request from the cell specific preamble set based on the preamble index, the preamble duration restriction, the selected preamble format. The preamble sequences for RRC messages can be legacy sequences, i.e., those sequences used in the legacy systems. Or alternatively, the preamble sequences for RRC messages can be newly defined cell specific sequence.

Next, in step 203, it may determine a configuration index for the request. The configuration index may be a predetermined or default index. Then the request for the RRC message can be transmitted from, for example, the boundary of the subframe.

Thus, the UE can determine the default transmission parameters for the RRC message. However, it shall be noticed that the above-described method is only given for a purpose of explanation and the present disclosure is not limited thereto. For example, the order of performing the steps can be changed; each of the steps may be modified or be taken separately to use with other different steps. All these changes do not deviate from the spirit of the present disclosure and still fall within the scope of the present disclosure.

In response to the request for the RRC message, the serving node, like eNB, will transmit a feedback containing the required RRC information to the UE at a predetermined timing. Detailed operations about the eNB will be described in the following context with reference to FIG. 3 and thus will not be elaborated herein.

Next, reference is made back to FIG. 1, in step 102, the UE receives the RRC message at a predetermined time unit, for example, within a predetermined subframe. In other words, after the request for the RRC message is transmitted, the RRC message will be transmitted from the eNB and the UE can receive the RRC message in predefined time/frequency resources. The RRC message can be carried by Physical Downlink Control Channel (PDCCH) and/or Physical Downlink Shared Channel (PDSCH).

The response window size and/or the predetermined timing can be used and they can be learned by the UE and thus the UE can obtain information in the RRC message. In other words, the RRC message can be decoded based on at least one of a predetermined response window size and a predetermined transmission timing. In addition or alternatively, the UE also needs to know the default scrambling value, and t_id and f_id value for CRC descrambling RNTI. Since these information can predetermined or default and can be easily learned by the UE. Thus, the RRC message can be obtained and further downlink or uplink transmission can be further processed.

However, if the RRC message is not received successfully, the UE may initiate the retransmission of the request for the RRC message. In the request retransmission, the power ramping and/or maximum transmission times can be determined based on predefined default values, e.g. those in the LTE specification.

In addition, the reference signal is useful in transmitting the RRC message. In embodiments of the present disclosure, the reference signal may include any of, for example, a discovery signal, a cell reference signal (CRS), channel status information reference signals (CSI-RS), a primary synchronization signal (PSS), a secondary synchronization signal (SSS), or any other kind of reference signal. In an embodiment of the present disclosure, the UE can receive the reference signal which is transmitted periodically from the network node. This means that the reference signal like DRS can be transmitted periodically while the RRC message can be transmitted based on the UE's request.

Figure 3:
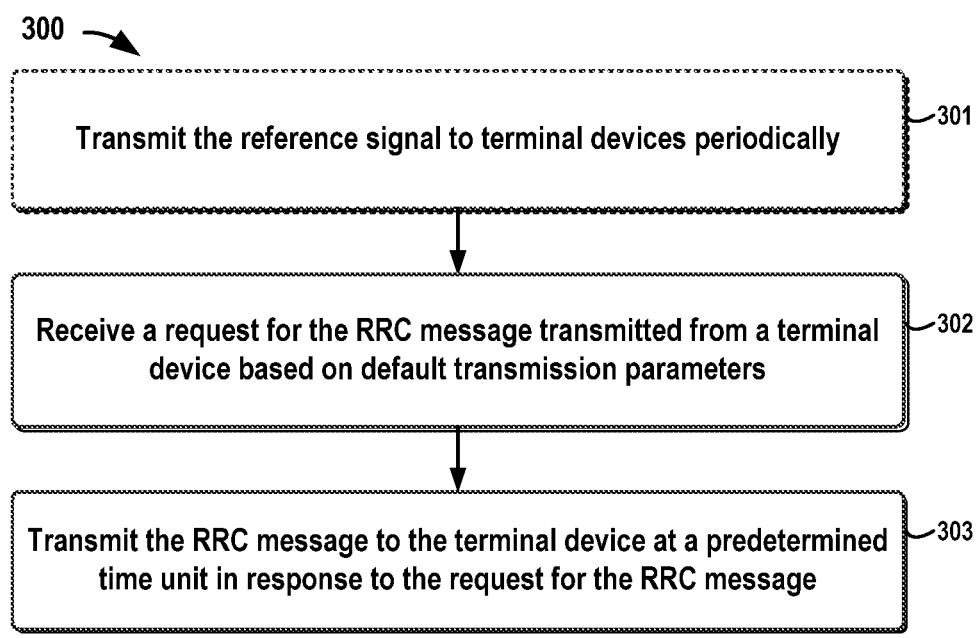
FIG. 3 schematically illustrates a flow chart of a method of transmitting information in a wireless communication system according to an embodiment of the present disclosure.

Next reference is made to FIG. 3 to describe the operations at the serving node. FIG. 3 schematically illustrates a flow chart of a method of transmitting information in a wireless communication system according to an embodiment of the present disclosure. The method 300 can be performed at a serving node, for example a BS, like a node B (NodeB or NB).

As illustrated in FIG. 3, in step 301, the eNB receives a request for the RRC message transmitted from a terminal device based on default transmission parameters. In embodiments of the present disclosure, the RRC message may include any of RRC information elements, security control information elements, mobility control information elements, measurement information elements, other information elements, Multimedia Broadcast Multicast Service (MBMS) information elements, Single Cell-Point To Multipoint (SC-PTM) information elements, sidelink information elements, system information blocks (SIB), master information blocks (MIB), paging message and other RRC messages newly defined in the future.

The request for the RRC message may be received in the uplink control channel, like PRACH, PUCCH, PUSCH, etc. In addition, the request for the RRC message may also be received in uplink reference signals.

The eNB blind decodes the request for the RRC message in non-transmitting subframes. If the eNB decodes the request successfully, in step 302, the eNB transmits the RRC message as a feedback to the terminal device at a predetermined time unit in response to the request for the RRC message. The feedback can be carried by PDCCH and/or PDSCH. It can use a default response window size which can be set to a default value, e.g. 1. The transmission timing can be predefined as well. For example, the feedback timing can be set to n+4, where n is the request transmission subframe index. The predefined transmission timing can also be the nearest following subframe meeting the required periodicity and offset. As such, the worst case is a periodic RRC message transmission.

In addition, the reference signal can be transmitted to terminal devices periodically so that the terminal device can learn enough reference signal information for transmitting the request for the RRC message. In embodiments of the present disclosure, the reference signal may include any of, for example, a discovery signal (DRS), a cell reference signal (CRS), channel status information reference signals (CSI-RS), a primary synchronization signal (PSS), a secondary synchronization signal (SSS), or any other kind of reference signal.

Figure 4:
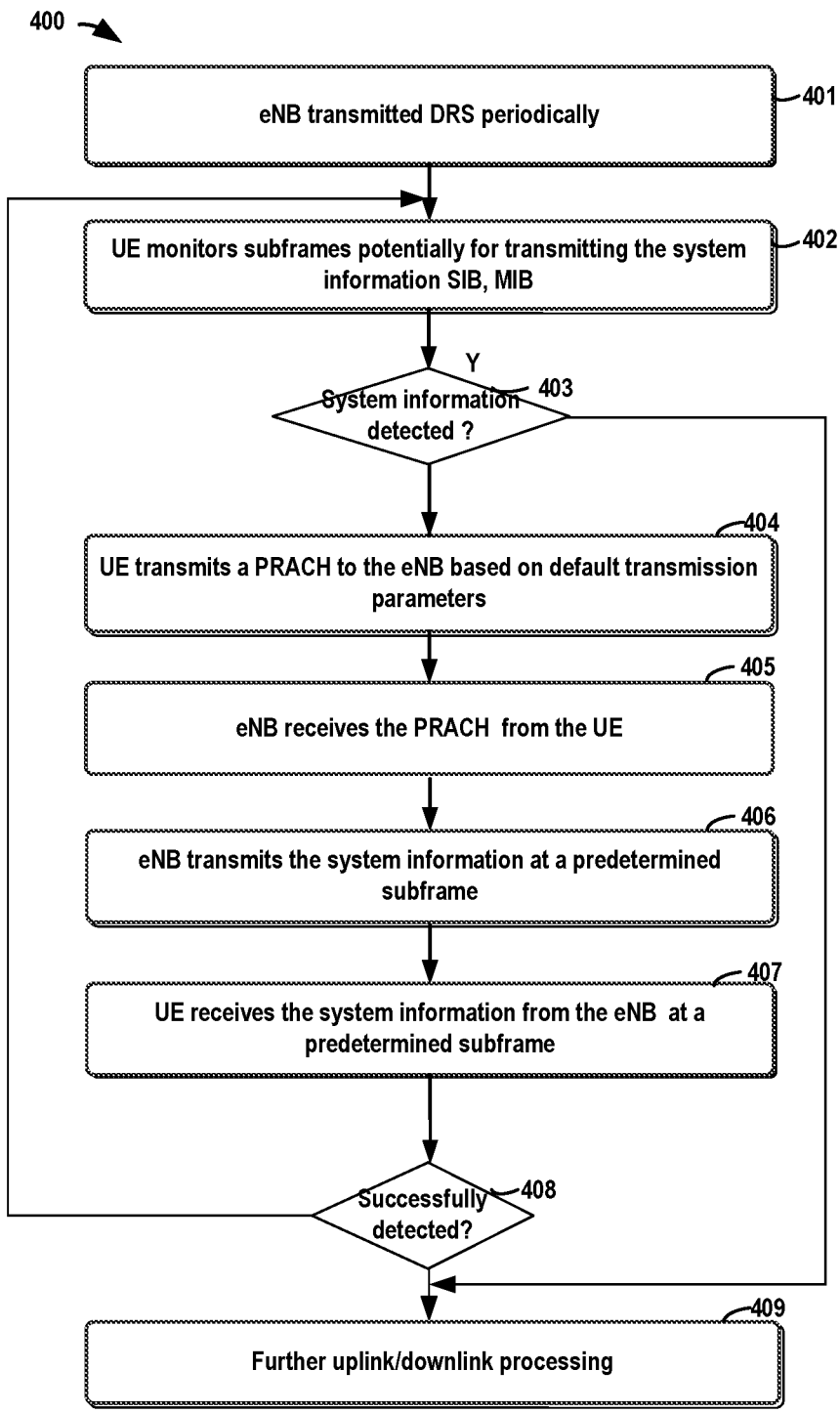
FIG. 4 schematically illustrates a flow chart of a method of information transmission and reception in a wireless communication system according to a specific implementation of the present disclosure.

For illustrative purposes, next reference will be made to FIG. 4 to describe a whole system flow chart of the information reception and transmission according to a specific embodiment of the present disclosure. In this specific implementation, the DRS will be taken as an example of the reference signal and the system information containing SIB, MIB, etc. will be taken as an example of the RRC message. However, the skilled in the art shall appreciate that they are given only for illustration purposes, other reference signals and/or other RRC message can transmitted by using the solution as proposed herein as well.

First, at step 401, the eNB periodically transmits DRS. The UE can get time/frequency synchronization and subframe index from the DRS based on DRS detection. When the UE requires the system information, then in step 402, the UE monitors subframes potentially transmitting the system information. For example, the UE can monitor the energy on subframes other than DRS subframes.

In step 403, it is determined whether the system is detected through the monitoring in step 402. If the energy is detected in a subframe, and the subframe is possibly the system information transmission subframe (e.g. subframe 0), then UE may blind decode the subframe to obtain the system information. Thus, the method directly goes to step 409 in which the system information can be used for further processing, for example further uplink processing and/or further downlink processing. On the other hand, if it is determined that the UE fails to detect the system information in potential subframes, i.e., no energy is detected and the system information is not available yet, the UE transmits PRACH based on default transmission parameters in step 404. The PRACH may contain a special indicator to indicate that it is related to a request for the system information. The default transmission parameters can be determined by, for example, using the method as described with reference to FIG. 2 and thus will be not be elaborated herein.

In step 405, the eNB receives the PRACH from the terminal device and blind decodes the PRACH in non-transmitting subframes. If the PRACH is decoded successfully, in step 406 the eNB may transmits the system information as a feedback at the predetermined time instance. The feedback can be carried by using PDCCH and/or PDSCH. The default response window size can be used as set to a default value, e.g. 1. The transmission timing can be predefined as well. For example, the feedback timing can be set to n+4, where n is the PRACH transmission subframe index. The predefined transmission timing can also be the nearest following subframe meeting the periodicity and offset. As such, the worst case is a periodic system information transmission. The system information can be carried in the PDSCH.

After the PRACH transmission, in step 407, the UE receives the system information transmitted from the eNB at a predetermined subframe. In other words, the UE receives the system information in predefined time/frequency resources and the UE can decode the system information based on at least one of the default response window size, predefined transmission timing, the default scrambling value and t_id and f_id value for CRC descrambling RNTI.

If the system information is successfully detected in step 408, the system information can be obtained and the method proceeds with step 409 in which further downlink/uplink transmission can also be processed.

If the system information is not successfully detected in step 408, the method goes back to step 402 to perform a PRACH retransmission. For the PRACH retransmission, the power ramping and/or maximum transmission times can be determined based on predefined default values, e.g. by the LTE specification.

Thus, in the present disclosure, it is proposed that a terminal device such as UE requests a RRC message based on default transmission parameters when the terminal device requires this RRC message, and the serving node such as NB or eNB can transmit the RRC message to the requested terminal device when it receives the request from the terminal device. Therefore, the RRC message can be transmitted only when it is required and therefore the RRC message transmission can be reduced and in turn, the inter-node interference can be limited, and the number of LBTs required for these signal transmissions can be reduced if they are transmitted on unlicensed spectrum.

Besides, in the present disclosure, there are also provided apparatuses for information reception and transmission in a wireless communication system, which will be described next with reference to FIGS. 5 and 6.

Figure 5:
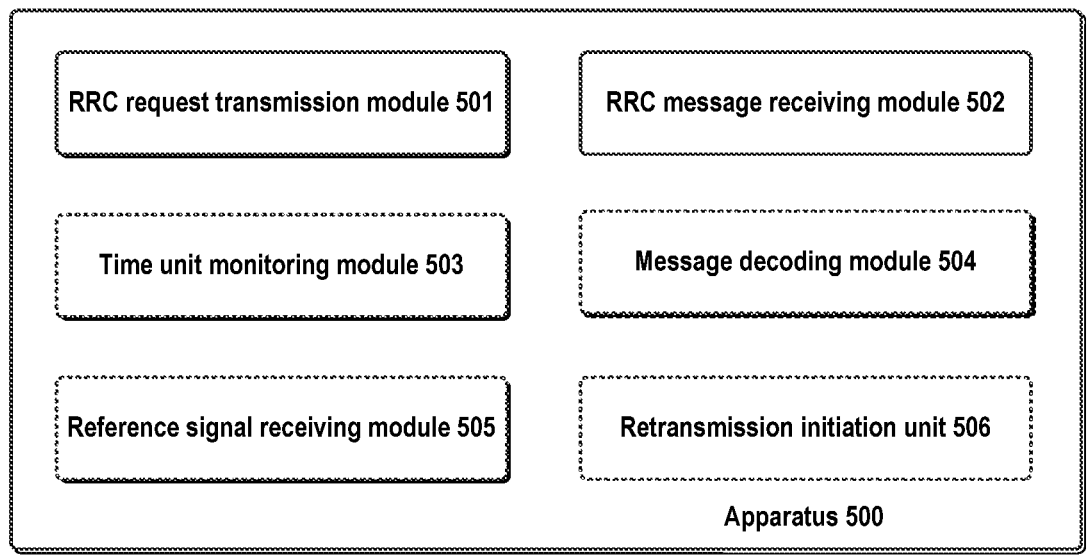
FIG. 5 schematically illustrates a block diagram of an apparatus for receiving information in a wireless communication system according to an embodiment of the present disclosure.

FIG. 5 schematically illustrates a block diagram of an apparatus 500 for receiving information in a wireless communication system according to an embodiment of the present disclosure. The apparatus 500 can be implemented at a terminal device, for example UE, or other like terminal devices.

In the embodiment as illustrated in the FIG. 5, the information at least comprises a radio resource control (RRC) message. As illustrated in FIG. 5, the apparatus 500 may comprise: an RRC request transmission module 501 and an RRC message receiving module 502. The RRC request transmission module 501 can be configured to transmit a request for the RRC message to the network node based on default transmission parameters. The RRC message receiving module 502 can be configured to receive the RRC message from the network node at a predetermined time unit.

In an embodiment of the present disclosure, the apparatus 500 may further comprise a time unit monitoring module 503. The time unit monitoring module 503 can be configured to monitor potential time units for transmitting the RRC message. In such a case, the request transmission module 501 may be further configured to transmit the request in response to failing to find the RRC message in the monitored time units.

In another embodiment of the present disclosure, the apparatus 500 may further comprise a message decoding module 504. The message decoding module 504 may be configured to decode the RRC message based on at least one of a predetermined response window size and a predetermined transmission timing.

In a further embodiment of the present disclosure, the information may further comprise a reference signal, the apparatus 500 may further comprise a reference signal receiving module 505. The reference signal receiving module 505 may be configured to receive the reference signal transmitted periodically from a network node.

In a still further embodiment of the present disclosure, the default transmission parameters may be determined by at least one of: determining a transmission power based on a predetermined target receive power and a reference signal receive power; determining a preamble sequence for the request based on at least one of a cell identifier carried in the reference signal, a selected preamble index, a preamble duration restriction and a selected preamble format; and determining a configuration index for the request.

In a still further embodiment of the present disclosure, the message receiving module 502 may be further configured to receive the RRC message in PDCCH and/or PDSCH. Additionally or alternatively, the request transmitting module 501 may be further configured to transmit the request for the RRC message in the uplink control channel.

In another embodiment of the present disclosure, the apparatus 500 may further comprise a retransmission initiation unit 506. The retransmission initiation unit 506 may be configured to initiate the retransmission of the request for the RRC message in response to failing to obtain the RRC message successfully.

In a further embodiment of the present disclosure, the reference signal may at least comprise a discovery signal and the RRC message may comprise at least one of a master information block (MIB), a system information block (SIB) and a paging message.

Figure 6:
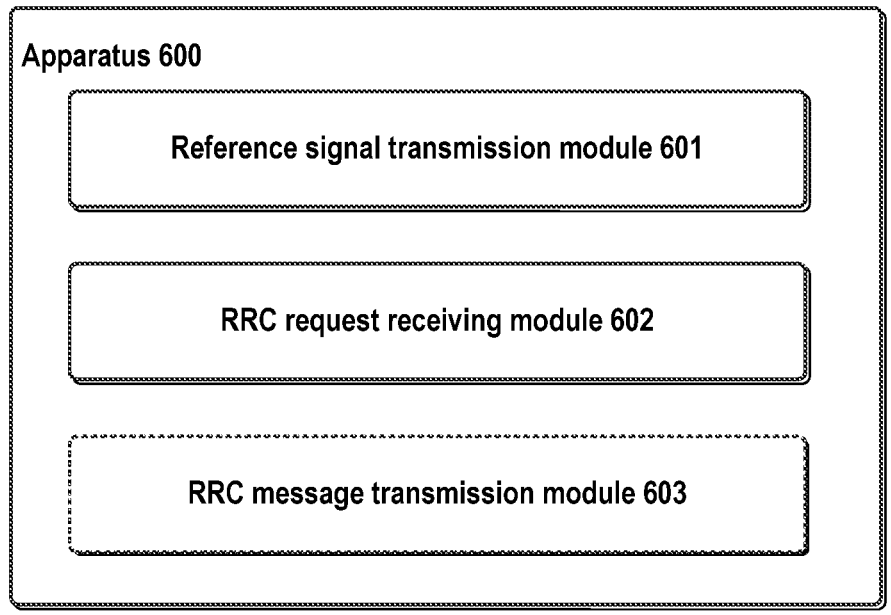
FIG. 6 schematically illustrates a block diagram of an apparatus for transmitting information in a wireless communication system according to an embodiment of the present disclosure.

FIG. 6 further schematically illustrates a block diagram of an apparatus 600 for transmitting information in a wireless communication system according to an embodiment of the present disclosure. The apparatus 600 can be performed at a serving node, for example a BS, like a node B (NodeB or NB).

In embodiment as illustrated in FIG. 6, the information at least comprises a radio resource control (RRC) message, and as illustrated in FIG. 6, the apparatus 600 comprises: an RRC request receiving module 601 and an RRC message transmission module 602. The RRC request receiving module 601 can be configured to receive a request for the RRC message transmitted from a terminal device based on default transmission parameters. The RRC message transmission module 602 can be configured to transmit the RRC message to the terminal device at a predetermined time unit in response to the request for the RRC message.

In an embodiment of the present disclosure, the RRC message transmission module 602 may be further configured to transmit the RRC message by using at least one of a predetermined response window size and predetermined transmission timing.

In another embodiment of the present disclosure, the RRC message transmission module 602 may be further configured to transmit the RRC message in PDCCH and/or PDSCH.

In a further embodiment of the present disclosure, the RRC request receiving module 601 may be further configured to receive the request for the RRC message in the uplink control channel.

In a still further embodiment the present disclosure, the information further may comprise a reference signal and the apparatus 600 may further comprise a reference signal transmission module 603. The reference signal transmission module 603 can be configured to transmit the reference signal to terminal devices periodically.

In a yet further embodiment of the present disclosure, the reference signal may at least comprise a discovery signal and the RRC message may comprise at least one of a master information block (MIB), a system information block (SIB) and a paging message.

Hereinbefore, the apparatuses 500 and 600 are described with reference to FIGS. 5 and 6. It is noted that the apparatuses 500 and 600 may be configured to implement functionalities as described with reference to FIGS. 1 to 4. Therefore, for details about the operations of modules in these apparatuses, one may refer to those descriptions made with respect to the respective steps of the methods with reference to FIGS. 1 to 4.

It is further noted that the components of the apparatuses 500 and 600 may be embodied in hardware, software, firmware, and/or any combination thereof. For example, the components of apparatuses 500 and 600 may be respectively implemented by a circuit, a processor or any other appropriate selection device. Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In some embodiment of the present disclosure, apparatuses 500 and 600 may comprise at least one processor. The at least one processor suitable for use with embodiments of the present disclosure may include, by way of example, both general and special purpose processors already known or developed in the future. Apparatuses 500 and 600 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 500 and 600 to at least perform operations according to the method as discussed with reference to FIGS. 1 to 4 respectively.

It shall be appreciated that although the DRS, the system information including MIB, and the SIB are described hereinabove, these signals are just given as examples for illustration purposes and in fact the present disclosure is not limited thereto. The idea of the present disclosure can also be applied in any other reference signals like CRS, CSI-RS, PSS, SSS, etc., and any other RRC messages like paging messages RRC information elements, security control information elements, mobility control information elements, measurement information elements, other information elements, MBMS information elements, SC-PTM information elements, sidelink information elements, and other RRC messages newly defined in the future.

While the present disclosure is mainly described with unlicensed spectrums and offer a great benefit thereto, the present disclosure is not limited only to the unlicensed spectrums but can be applied normal communication and provide benefit of reduced inter-node interferences.

Figure 7:
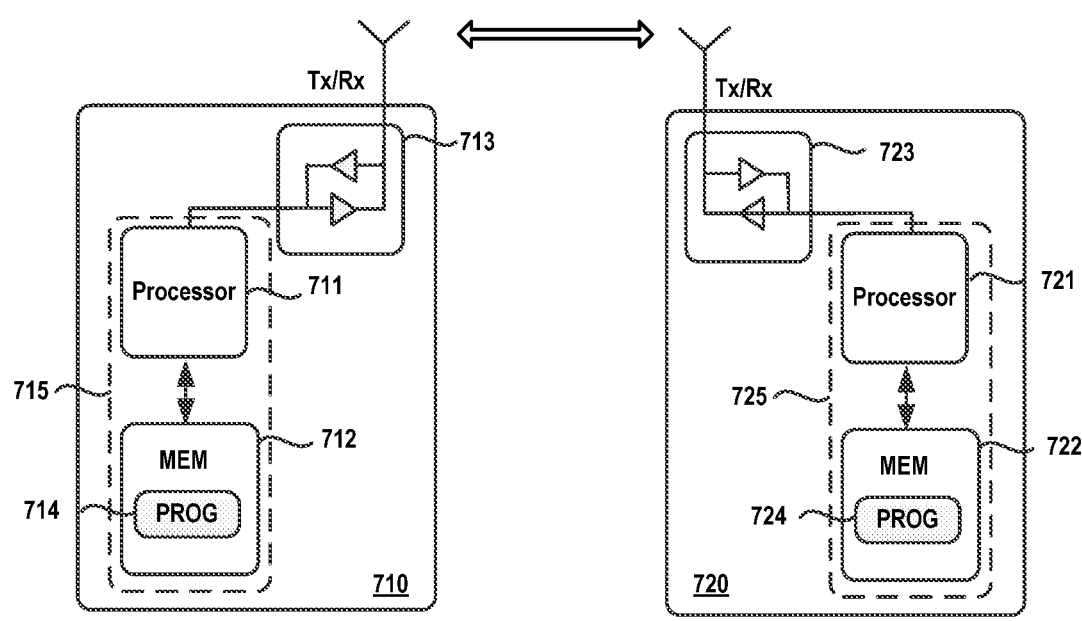
FIG. 7 further illustrates a simplified block diagram of an apparatus 710 that may be embodied as or comprised in UE and an apparatus 720 that may be embodied as or comprised in a base station in a wireless network as described herein.

FIG. 7 further illustrates a simplified block diagram of an apparatus 710 that may be embodied as or comprised in a terminal device such as UE in a wireless network and an apparatus 720 that may be embodied as or comprised in a base station such as NB or eNB as described herein.

The apparatus 710 comprises at least one processor 711, such as a data processor (DP) and at least one memory (MEM) 712 coupled to the processor 711. The apparatus 710 may further comprise a transmitter TX and receiver RX 713 coupled to the processor 711, which may be operable to communicatively connect to the apparatus 720. The MEM 712 stores a program (PROG) 714. The PROG 714 may include instructions that, when executed on the associated processor 711, enable the apparatus 710 to operate in accordance with embodiments of the present disclosure, for example the method 100, 200. A combination of the at least one processor 711 and the at least one MEM 712 may form processing means 715 adapted to implement various embodiments of the present disclosure.

The apparatus 720 comprises at least one processor 721, such as a DP, and at least one MEM 722 coupled to the processor 721. The apparatus 720 may further comprise a suitable TX/RX 723 coupled to the processor 721, which may be operable for wireless communication with the apparatus 710. The MEM 722 stores a PROG 724. The PROG 724 may include instructions that, when executed on the associated processor 721, enable the apparatus 720 to operate in accordance with the embodiments of the present disclosure, for example to perform the method 300. A combination of the at least one processor 721 and the at least one MEM 722 may form processing means 725 adapted to implement various embodiments of the present disclosure.

Various embodiments of the present disclosure may be implemented by computer program executable by one or more of the processors 711, 721, software, firmware, hardware or in a combination thereof.

The MEMs 712 and 722 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 711 and 721 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a terminal device, the method comprising:
   transmitting, to a network device, a request for a system information in a Physical Random Access Channel (PRACH), wherein the transmitting the request comprises:

transmitting a preamble for the request in the PRACH, wherein the preamble is transmitted based on a reference signal comprising primary synchronization signal (PSS), a secondary synchronization signal (SSS); and receiving the system information from the network device based on a transmission timing, wherein the transmission timing is determined based a periodicity of the system information.

2. The method of claim 1, further comprising:

receiving the system information based on response window size and a transmission timing for the system information.

3. The method of claim 1, wherein the preamble is transmitted based on a preamble duration restriction.

4. The method of claim 1, wherein the receiving the system information comprises: receiving the system information in Physical Downlink Control Channel (PDCCH) or Physical Downlink Shared Channel (PDSCH).

5. The method of claim 1, further comprising:

initiating a retransmission of the request for the system information in response to failing to obtain the system information successfully.

6. A method performed by a network device, the method comprising:

receiving, from a terminal device, a request for a system information in a Physical Random Access Channel (PRACH), wherein the receiving the request comprises:

receiving a preamble for the request in the PRACH, wherein the preamble is transmitted based on a reference signal comprising primary synchronization signal (PSS), a secondary synchronization signal (SSS); and transmitting the system information to the terminal device based on a transmission timing, wherein the transmission timing is determined based a periodicity of the system information.

7. The method of claim 6, wherein the transmitting the system information comprises transmitting the system information based on response window size and a transmission timing for the system information.

8. The method of claim 6, wherein the transmitting the system information comprises transmitting the system information in in Physical Downlink Control Channel (PDCCH) or Physical Downlink Shared Channel (PDSCH).

9. A terminal device comprising:

a memory configured to store one or more instructions; and a processor configured to: transmit, to a network device, a request for a system information in a Physical Random Access Channel (PRACH), wherein the processor is further configured to:

transmit a preamble for the request in the PRACH, wherein the preamble is transmitted based on a reference signal comprising primary synchronization signal (PSS), a secondary synchronization signal (SSS); and receive system information from the network device based on a transmission timing, wherein the transmission timing is determined based a periodicity of the system information.

10. The terminal device of claim 9, wherein the processor is further configured to receive the system information based on response window size and a transmission timing for the system information.

11. The terminal device of claim 9, wherein the preamble is transmitted based on a preamble duration restriction.

12. The terminal device of claim 9, wherein the processor is further configured to receive the system information in Physical Downlink Control Channel (PDCCH) or Physical Downlink Shared Channel (PDSCH).

\* \* \* \* \*

UNITED STATES PATENT AND TRADEMARK OFFICE
CERTIFICATE OF CORRECTION

PATENT NO. : 11,246,181 B2
APPLICATION NO. : 16/318981
DATED : February 8, 2022
INVENTOR(S) : Hongmei Liu, Lei Jiang and Gang Wang It is certified that error appears in the above-identified patent and that said Letters Patent is hereby corrected as shown below:

In the Claims

Column 13, Line 7; In Claim 1, after "based", please insert -- on --

Column 13, Line 36; In Claim 6, after "based", please insert -- on --

Signed and Sealed this
Twenty-fourth Day of January, 2023

Katherine Kelly Vidal
*Director of the United States Patent and Trademark Office*